(12) United States Patent
Liu et al.

(10) Patent No.: US 11,402,260 B2
(45) Date of Patent: Aug. 2, 2022

(54) METHOD FOR ADJUSTING OPENABLE ANGLE OF DISPLAY SCREENS AND MULTI-SCREEN TERMINAL

(71) Applicant: XI'AN ZTE NEW SOFTWARE COMPANY LIMITED, Shaanxi (CN)

(72) Inventors: Fengpeng Liu, Shaanxi (CN); Dongmei Liu, Shaanxi (CN)

(73) Assignee: XI'AN ZTE NEW SOFTWARE COMPANY LIMITED, Xi'An (CN)

( * ) Notice: Subject to any disclaimer, the term of this patent is extended or adjusted under 35 U.S.C. 154(b) by 374 days.

(21) Appl. No.: 16/630,553

(22) PCT Filed: Aug. 29, 2017

(86) PCT No.: PCT/CN2017/099472
§ 371 (c)(1),
(2) Date: Jan. 13, 2020

(87) PCT Pub. No.: WO2019/010768
PCT Pub. Date: Jan. 17, 2019

(65) Prior Publication Data
US 2021/0088379 A1 Mar. 25, 2021

(30) Foreign Application Priority Data
Jul. 13, 2017 (CN) .......................... 201710570874.4

(51) Int. Cl.
*G01J 1/42* (2006.01)
*G06T 7/70* (2017.01)
(Continued)

(52) U.S. Cl.
CPC .............. *G01J 1/4204* (2013.01); *G06T 7/70* (2017.01); *H04M 1/72454* (2021.01);
(Continued)

(58) Field of Classification Search
CPC ..................... G01J 1/4204; G06T 7/70; G06T 2207/30201; G09F 9/00; G09G 3/36;
(Continued)

(56) References Cited

U.S. PATENT DOCUMENTS 8,319,765 B2 11/2012 Wang
2009/0174658 A1 7/2009 Blatchley
(Continued)

FOREIGN PATENT DOCUMENTS

CN 102024384 A 4/2011
CN 102215281 A 10/2011
(Continued)

OTHER PUBLICATIONS

China Patent Office, Second Office Action (OA2) dated Mar. 16, 2021 regarding CN201710570874.4 and the English translation thereof.
(Continued)

*Primary Examiner* — Mark R Gaworecki
(74) *Attorney, Agent, or Firm* — Vivacqua Crane, PLLC

(57) ABSTRACT

A method for adjusting an openable angle of display screens, and a multi-screen terminal. The method includes: detecting, by a multi-screen terminal, an intensity of ambient light and a corresponding light incident angle of each display screen, and obtaining a currently used display screen as well as a viewpoint angle between the currently used display screen and a user; judging, by the multi-screen terminal, whether the intensity of ambient light corresponding to a light incident angle having the smallest difference with the viewpoint angle is greater than a preset value, and adjusting, under the condition that the viewpoint angle is greater than the preset value, an openable angle between the display screens until the multi-screen terminal judges that the intensity of ambient light corresponding to the light incident
(Continued)

angle that is closest to the current viewpoint angle is less than or equal to the preset value.

11 Claims, 2 Drawing Sheets

(51) Int. Cl.
    *H04M 1/73*     (2006.01)
    *H04M 1/72*     (2021.01)
    *H04M 1/72454*     (2021.01)
    *H04M 1/02*     (2006.01)

(52) U.S. Cl.
    CPC ..... *H04M 1/73* (2013.01); *G06T 2207/30201* (2013.01); *H04M 1/0214* (2013.01); *H04M 2250/16* (2013.01)

(58) Field of Classification Search
    CPC .. H04M 1/0214; H04M 1/72454; H04M 1/73; H04M 2250/16
    See application file for complete search history.

(56) References Cited

U.S. PATENT DOCUMENTS

| | | |
|---|---|---|
| 2011/0069079 A1 | 3/2011 | Wang |
| 2013/0006578 A1 | 1/2013 | Lin et al. |

FOREIGN PATENT DOCUMENTS

| | | | |
|---|---|---|---|
| CN | 102215281 A | * | 10/2011 |
| CN | 104767888 A | | 7/2015 |
| CN | 104898820 A | | 9/2015 |
| EP | 2808652 A1 | | 12/2014 |
| JP | H 1116027 A | | 1/1999 |
| JP | 2009069444 A | | 4/2009 |
| JP | 2011090236 A | | 5/2011 |
| JP | 2011223251 A | | 11/2011 |
| JP | 2013007827 A | | 1/2013 |
| KR | 100623732 B1 | | 9/2006 |
| TW | 200931218 A | | 7/2009 |
| TW | I 358013 B | | 2/2012 |

OTHER PUBLICATIONS

European Patent Office, Extended European Search Report regarding EP17917699.5 dated Mar. 1, 2021.
Japan Patent Office, First Office Action dated Mar. 9, 2021 regarding JP2020-501281 and the English translation thereof.
China Patent Office, First Office Action (OA1) dated Sep. 18, 2020 for application No. CN201710570874.4.
WIPO, International Search Report dated Mar. 20, 2018.
European Patent Office. Summons to Attend Oral Proceedings Pursuant to Rule 115(1) EPC and Communication from the Examining Division for EP Application No. 17917699.5, dated Apr. 5, 2022, pp. 1-7.

* cited by examiner

METHOD FOR ADJUSTING OPENABLE ANGLE OF DISPLAY SCREENS AND MULTI-SCREEN TERMINAL

TECHNICAL FIELD

The present disclosure relates to the field of communication technologies, in particular to a method for adjusting an openable angle of display screens and a multi-screen terminal.

BACKGROUND

With the rapid development of smart mobile terminals, more and more mobile smart terminals are provided with multiple display screens. When a mobile smart terminal with multiple display screens is used for application display, each of the display screens may display different parts of the same content, or may display different contents. For example, with the existing dual-screen mobile terminal (such as a dual-screen mobile phone), a user can independently operate two display screens. That is, the two screens may be used for watching television, listening to music, surfing the internet and the like respectively so that one smart terminal has multiple functions.

In an environment of intense light, the existing mobile terminals typically ensure the display effect by increasing the screen brightness. However, since a multi-screen terminal displays through more than one screen, which involves great power consumption itself, the problem with power consumption will be aggravated if the display effect is still ensured by means of increasing the screen brightness.

SUMMARY

In order to solve the above technical problem, in the embodiments of the present disclosure, there is provided a method for adjusting an openable angle of display screens and a multi-screen terminal that can improve the display effect of the multi-screen terminal without increasing the power consumption of the multi-screen terminal.

To achieve the objects of the disclosure, the technical solutions in the embodiments of the disclosure are implemented as follows:

In an embodiment of the present disclosure, there is provided a method for adjusting an openable angle of display screens, including: detecting, by a multi-screen terminal, an intensity of ambient light and a corresponding light incident angle of each display screen, and obtaining a currently used display screen as well as a viewpoint angle between the currently used display screen and a user; judging, by the multi-screen terminal, whether the intensity of ambient light corresponding to a light incident angle having the smallest difference with the viewpoint angle is greater than a preset value, and adjusting an openable angle between the display screens until the multi-screen terminal judges that the intensity of ambient light corresponding to the light incident angle that is closest to the current viewpoint angle is less than or equal to the preset value under the condition that the viewpoint angle is greater than the preset value.

In an embodiment of the present disclosure, there is further provided a multi-screen terminal, including a detecting module, a processing module and an adjusting module. The detecting module is configured to detect an intensity of ambient light and a corresponding light incident angle of each display screen, and obtain a currently used display screen as well as a viewpoint angle between the currently used display screen and a user, and output the detected intensity of ambient light and light incident angle as well as the obtained viewpoint angle to the processing module; the processing module is configured to compare the intensity of ambient light corresponding to a light incident angle having the smallest difference with the viewpoint angle with a preset value, send a first notification to the adjusting module under the condition that the viewpoint angle is greater than the preset value, and send a second notification to the adjusting module under the condition of the viewpoint angle is less than or equal to the preset value; and the adjusting module is configured to adjust the openable angle between the display screens after receiving the first notification from the processing module, and stop adjusting the openable angle between the display screens after receiving the second notification from the processing module.

In an embodiment of the present disclosure, there is provided a storage medium having an executable instruction stored thereon which causes the above method for adjusting an openable angle of display screens according to the above embodiment to be implemented.

The technical solutions of the embodiments of the present disclosure have the following beneficial effects:

In the method for adjusting an openable angle of display screens and the multi-screen terminal provided in the embodiments of the disclosure, by adjusting the openable angle between the display screen that is currently used by the user and other display screens, the intensity of ambient light corresponding to the light incident angle that is closest to the current viewpoint angle is less than or equal to the preset value, and thus the user is allowed to experience the smallest degree of light reflection by the display screen, which overcomes the defect in the prior art that the brightness and the power consumption are required to be increased to ensure the display effect under intense light, and improves the display effect of the multi-screen terminal without increasing the power consumption of the multi-screen terminal.

BRIEF DESCRIPTION OF THE DRAWINGS

The drawings described herein are intended to provide a further understanding of the present disclosure and to be a part of the present disclosure. The exemplary embodiments of the present disclosure and the description thereof are for explaining the present disclosure and do not constitute any undue limitation of the present disclosure. In the drawings.

DETAILED DESCRIPTION

For clarity and better understanding of objects, technical solutions and advantages of the disclosure, embodiments of the disclosure will be described in detail below in conjunction with the accompanying drawings. It should be noted that the embodiments of the disclosure and features therein may be combined with each other in any manner as long as they are not contradictory.

Figure 1:
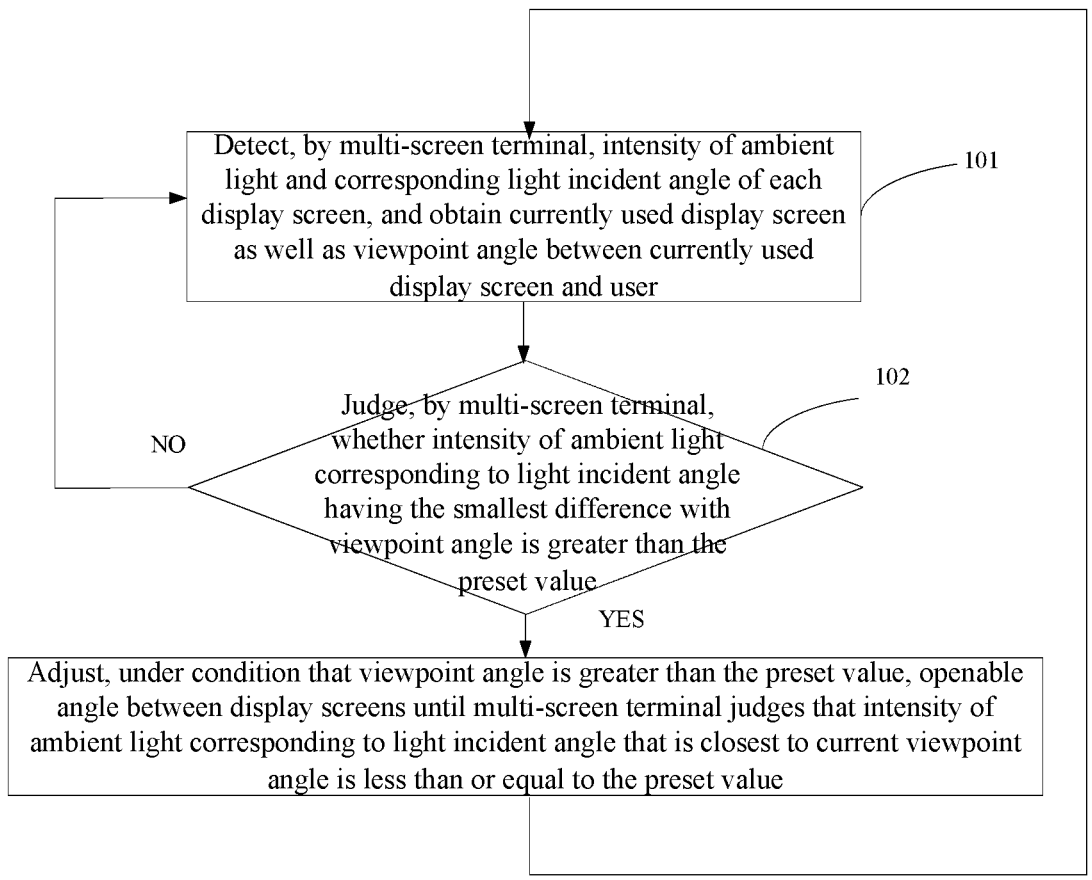
FIG. 1 is a schematic flowchart of a method for adjusting an openable angle of display screens according to an embodiment of the present disclosure.

As shown in FIG. 1, a method for adjusting an openable angle of display screens according to the present disclosure includes the following steps 101 to 102.

At step 101, a multi-screen terminal detects an intensity of ambient light and a corresponding light incident angle of each display screen, and obtains a currently used display screen as well as a viewpoint angle between the currently used display screen and a user.

Furthermore, the multi-screen terminal detects the intensity of ambient light and the corresponding light incident angle of each display screen through at least one light sensor.

In an embodiment of the present disclosure, the light sensor is an infrared sensor or an RGB (Red Green Blue) sensor.

Furthermore, the multi-screen terminal obtains the currently used display screen as well as the viewpoint angle between the currently used display screen and the user through a camera or other detecting means.

It should be noted that how to detect the intensity of ambient light and the corresponding light incident angle of each display screen through a light sensor, and how to obtain the currently used display screen as well as the viewpoint angle between the currently used display screen and the user through a camera or other detecting means both belong to the prior art in the field, and thus are not limited herein.

At step 102, the multi-screen terminal judges whether the intensity of ambient light corresponding to a light incident angle having the smallest difference with the viewpoint angle is greater than a preset value, and adjusts, under the condition that the viewpoint angle is greater than the preset value, an openable angle between the display screens until the multi-screen terminal judges that the intensity of ambient light corresponding to a light incident angle that is closest to the current viewpoint angle is less than or equal to the preset value.

It should be noted that the preset value may be preset before the terminal leaves the factory or may be set by the user. The smaller degree of light reflection by the currently used display screen is, or the shorter the habitual distance of the user to the currently used display screen is, the less light reflection intensity felt by the user, and the larger the preset value may be set. Between the display screens of the terminal, there is provided a rotation shaft with a motor. The openable angle between the display screens is adjusted by controlling rotation of the motor.

Further, in the step 102, after the multi-screen terminal judges that the intensity of ambient light corresponding to the light incident angle having the smallest difference with the viewpoint angle is greater than the preset value, and before adjusting the openable angle between the display screens, the multi-screen terminal gives a prompt about whether the openable angle between the display screens needs to be adjusted on the currently used display screen.

Figure 2:
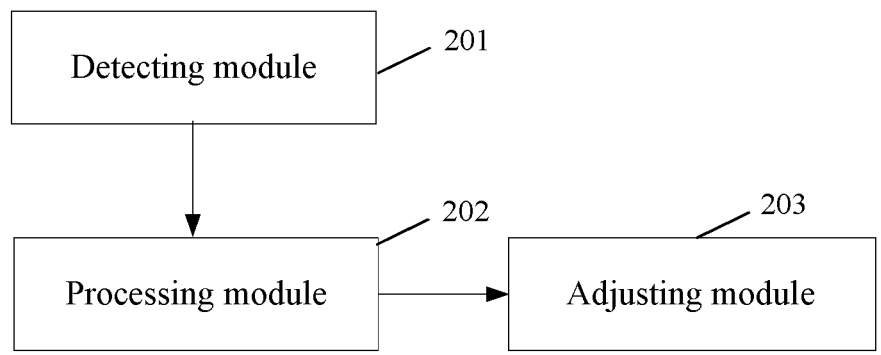
FIG. 2 is a schematic diagram illustrating a structure of a multi-screen terminal according to an embodiment of the present disclosure.

As shown in FIG. 2, a multi-screen terminal according to the present disclosure includes a detecting module 201, a processing module 202 and an adjusting module 203.

The detecting module 201 is configured to detect an intensity of ambient light and a corresponding light incident angle of each display screen, and obtain a currently used display screen as well as a viewpoint angle between the currently used display screen and a user, and output the detected intensity of ambient light and light incident angle as well as the obtained viewpoint angle to the processing module 202.

The processing module 202 is configured to compare the intensity of ambient light corresponding to a light incident angle having the smallest difference with the viewpoint angle with a preset value, send, under the condition that the viewpoint angle is greater than the preset value, a first notification to the adjusting module 203, and send, under the condition of the viewpoint angle is less than or equal to the preset value, a second notification to the adjusting module 203.

The adjusting module 203 is configured to adjust, after receiving the first notification from the processing module 202, the openable angle between the display screens, and stop adjusting, after receiving the second notification from the processing module 202, the openable angle between the display screens.

Further, the detecting module 201 detects the intensity of ambient light and the corresponding light incident angle of each display screen through at least one light sensor.

In an embodiment of the present disclosure, the light sensor is an infrared sensor or an RGB sensor.

Further, the detecting module 201 obtains the currently used display screen as well as the viewpoint angle between the currently used display screen and the user through a camera.

Further, after the processing module 202 judges that the intensity of ambient light is greater than the preset value, and before sending the first notification to the adjusting module 203, the processing module 202 gives a prompt about whether the openable angle between the display screens needs to be adjusted on the currently used display screen, and sends, under the condition that an adjustment is needed, the first notification to the adjusting module 203.

The following describes how to apply the method for adjusting an openable angle of display screens and the terminal of the present disclosure through a preferred embodiment. It should be noted that the preferred embodiment below is only for better illustration of the present disclosure and should not be construed as unduly limiting the present disclosure.

Figure 3:
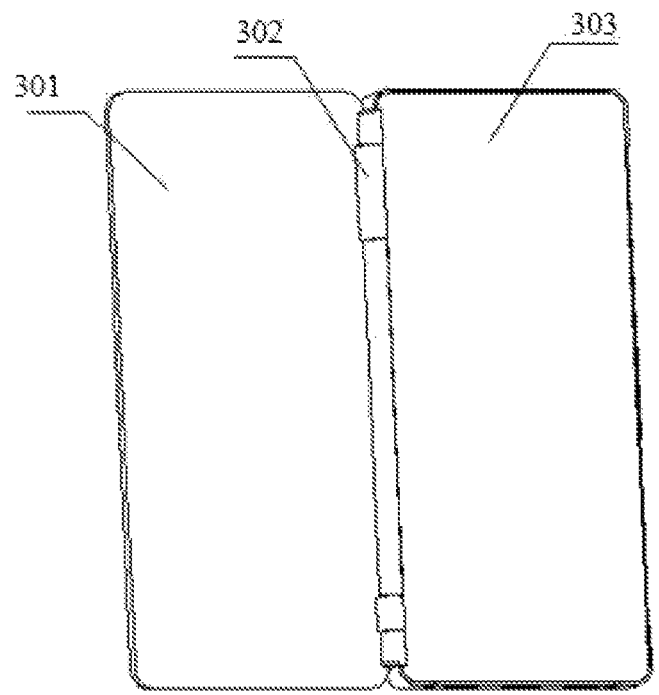
FIG. 3 is a schematic diagram illustrating an overall structure of a dual-screen mobile phone according to a preferred embodiment of the present disclosure.

As shown in FIG. 3, a dual-screen mobile terminal is foldable within a range of 0° to 180° in the left-right direction, in which 301 is defined as an auxiliary screen on which a sensor for detecting an intensity of ambient light and a light incident angle, and a camera for detecting a display screen that is currently used by a user as well as a viewpoint angle are designed; 303 is defined as a main screen on which a sensor for detecting an intensity of ambient light and a light incident angle, and a camera for detecting a display screen that is currently used by a user as well as a viewpoint angle are designed; and 302 is defined as a connection means for connecting various functions of the main screen and the auxiliary screen, and is designed with a motor which enables automatic rotation of the display screens of the terminal.

Figure 4:
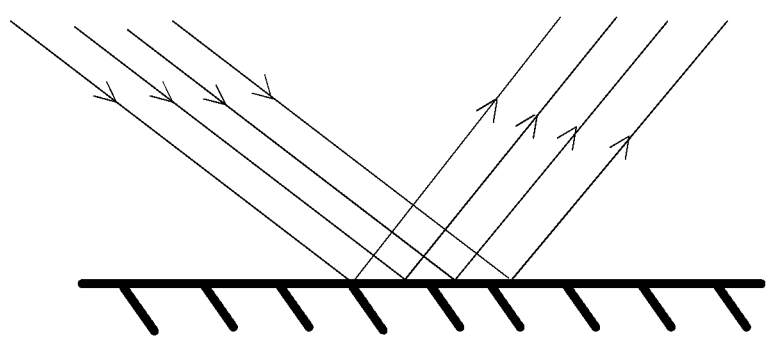
FIG. 4 is a schematic diagram illustrating the detection principle of a light sensor according to a preferred embodiment of the present disclosure.

As shown in FIG. 4, the main and auxiliary screens both detect with a light sensor, such as an infrared or RGB sensor, and collect the current light intensity and light incident distribution on the main and auxiliary screens in real time.

Specifically, in an actual application environment where the light incidence is relatively complicated, various angles and intensities of light are generally mixed together, as shown in FIG. 4. This embodiment illustrates a list optimization method. As shown in Table 1, incident angles of various levels of light are recorded according to the light intensity or illuminance levels from high to low.

TABLE 1

| Light intensity or illuminance level | Light intensity or illuminance | Incident angle |
|---|---|---|
| First level | 8000 lx | 30° |
| Second level | 3000 lx | 48° |
| ... | ... | ... |
| Nth level | 1000 lx | 86° |

It should be noted that intensity of light illumination is a physical term which refers to the luminous flux of visible light received per unit area, and is also called light intensity or illuminance for short, and the unit, Lux (or Lx), is a term used to quantify the intensity of illuminance and the illuminated degree of an object surface.

Cameras of the main and auxiliary screens are turned on to collect relative positions of the user's eyes and the terminal, obtain a display screen currently used by the user as well as a viewpoint angle between the currently used display screen and the user, and judge the level of light whose reflection range the human eyes fall into. Assuming that the viewpoint angle between the display screen that is currently used by the user and the user is 40°, the incident angle closest to the current viewpoint angle is 48°, that is, the human eyes fall into the second level of light intensity, as shown in Table 2.

TABLE 2

| Light intensity or illuminance level | Light intensity or illuminance | Incident angle | Human eyes fall in |
|---|---|---|---|
| First level | 8000 lx | 30° | No |
| Second level | 3000 lx | 48° | Yes |
| ... | ... | ... | ... |
| Nth level | 1000 lx | 86° | No |

The second level of light intensity is compared with a preset value to judge the degree of current light reflection of the screen surface felt by the user. Typically, the preset value varies with materials of display screens of the mobile phone and usage habits of the user (for example, the user may feel different degrees of light reflection as the distance between the eyes of the user and the display screen changes). For example, the preset value may be set between 800 lx and 1000 lx. Specifically, as shown in Table 2, assuming that the viewpoint angle falls into the second highest light intensity, and the second level of light intensity is 3000 lx, which is greater than the preset value, it is judged that the user feels obvious reflection, and improvement is required.

According to the collected data and the judgment as described above, a more optimal attitude of the terminal is calculated, where "more optimal" means better display effect without increasing screen brightness.

In particular, an object of judging the more optimal attitude is to allow the human eyes to fall into a lower light intensity or illuminance level, as shown in Table 3. The difference between the current attitude and the more optimal attitude, such as the most important openable angle, is calculated.

TABLE 3

| Light intensity or illuminance level | Angle of incidence | Human eyes fall in | More optimal attitude |
|---|---|---|---|
| First level | 30° | No | ... |
| Second level | 48° | Yes | ... |

TABLE 3-continued

| Light intensity or illuminance level | Angle of incidence | Human eyes fall in | More optimal attitude |
|---|---|---|---|
| ... | ... | ... | ... |
| Nth level | 86° | No | Human eyes fall into a lower light intensity or illuminance level |

Several optimization schemes are provided for the user to select, such as: giving a prompt about whether the openable angle between the current display screen and other display screens can be automatically adjusted to achieve a better display effect without increasing the brightness and the power consumption.

If the user selects to automatically adjust the openable angle between the current display screen and other display screens, then:

a target openable angle is judged, where the calculation method may be obtained from above; and the current openable angle is detected, the difference with the target openable angle is judged, and a motor is controlled to automatically adjust the openable angle of the current display screen to finally reach the target openable angle.

In the method for adjusting an openable angle of display screens and the multi-screen terminal provided in the present disclosure, by adjusting the openable angle between the display screen that is currently used by the user and other display screens, the intensity of ambient light corresponding to the light incident angle that is closest to the current viewpoint angle is less than or equal to the preset value, and thus the user is allowed to experience the smallest degree of light reflection by the display screen, which overcomes the defect in the prior art that the brightness and the power consumption are required to be increased to ensure the display effect under intense light, and improves the display effect of the multi-screen terminal without increasing the power consumption of the multi-screen terminal.

The technical solutions of the present application are not limited to wired devices or wireless terminals, but may be an industrial control display terminal, a portable product or other vehicle-mounted visual devices, and are reliable and low in cost.

One of ordinary skill in the art will appreciate that all or part of the steps described above may be implemented by a program stored in a computer readable storage medium for instructing the associated hardware, such as a read-only memory, a magnetic or optical disk, and the like. Optionally, all or part of the steps in the above embodiments may also be implemented by one or more integrated circuits. Accordingly, respective modules/units in the above embodiments may be implemented in the form of hardware, or in the form of a software function module. The present disclosure is not limited to any particular combination form of hardware and software.

The descriptions above are only preferred embodiments of the present disclosure, which are not used to limit the present disclosure. For those skilled in the art, the present disclosure may have various changes and variations. Any amendments, equivalent substitutions, improvements, etc. within the spirit and principle of the disclosure are all included in the scope of the protection of the disclosure.

INDUSTRIAL APPLICABILITY

In the method for adjusting an openable angle of display screens and the multi-screen terminal provided in the embodiments of the disclosure, by adjusting the openable angle between the display screen that is currently used by the user and other display screens, the intensity of ambient light corresponding to the light incident angle that is closest to the current viewpoint angle is less than or equal to the preset value, and thus the user is allowed to experience the smallest degree of light reflection by the display screen, which overcomes the defect in the prior art that the brightness and the power consumption are required to be increased to ensure the display effect under intense light, and improves the display effect of the multi-screen terminal without increasing the power consumption of the multi-screen terminal.

What is claimed is:

1. A method for adjusting an openable angle of display screens, comprising:

detecting, by a multi-screen terminal, an intensity of ambient light and a corresponding light incident angle of each display screen, and obtaining a currently used display screen as well as a viewpoint angle between the currently used display screen and a user;

judging, by the multi-screen terminal, whether the intensity of ambient light corresponding to a light incident angle having the smallest difference with the viewpoint angle is greater than a preset value, and adjusting, by the multi-screen terminal, an openable angle between the display screens until the multi-screen terminal judges that the intensity of ambient light corresponding to the light incident angle that is closest to the current viewpoint angle is less than or equal to the preset value under the condition that the viewpoint angle is greater than the preset value.

2. The method according to claim 1, wherein the multi-screen terminal detects the intensity of ambient light and the corresponding light incident angle of each display screen through at least one light sensor.

3. The method according to claim 2, wherein the light sensor is an infrared sensor or an RGB sensor.

4. The method according to claim 1, wherein the multi-screen terminal obtains the currently used display screen as well as the viewpoint angle between the currently used display screen and the user through a camera.

5. The method according to claim 1, wherein after the multi-screen terminal judges that the intensity of ambient light corresponding to the light incident angle having the smallest difference with the viewpoint angle is greater than the preset value, and before adjusting the openable angle between the display screens, the multi-screen terminal gives a prompt about whether the openable angle between the display screens needs to be adjusted on the currently used display screen.

6. A non-transitory computer-readable storage medium having an executable instruction stored thereon, wherein when executed by a processor, the executable instruction implements the method for adjusting an openable angle of display screens according to claim 1.

7. A multi-screen terminal, comprising a detecting module, a processing module and an adjusting module, wherein:

the detecting module is configured to detect an intensity of ambient light and a corresponding light incident angle of each display screen, and obtain a currently used display screen as well as a viewpoint angle between the currently used display screen and a user, and output the detected intensity of ambient light and light incident angle as well as the obtained viewpoint angle to the processing module;

the processing module is configured to compare the intensity of ambient light corresponding to a light incident angle having the smallest difference with the viewpoint angle with a preset value, send a first notification to the adjusting module under the condition that the viewpoint angle is greater than the preset value, and send a second notification to the adjusting module under the condition of the viewpoint angle is less than or equal to the preset value; and the adjusting module is configured to adjust the openable angle between the display screens after receiving the first notification from the processing module, and stop adjusting the openable angle between the display screens after receiving the second notification from the processing module.

8. The multi-screen terminal according to claim 7, wherein the detecting module detects the intensity of ambient light and the corresponding light incident angle of each display screen through at least one light sensor.

9. The multi-screen terminal according to claim 8, wherein the light sensor is an infrared sensor or an RGB sensor.

10. The multi-screen terminal according to claim 7, wherein the detecting module obtains the currently used display screen as well as the viewpoint angle between the currently used display screen and the user through a camera.

11. The multi-screen terminal according to claim 7, wherein after the processing module judges that the corresponding intensity of ambient light is greater than the preset value, and before sending the first notification to the adjusting module, the processing module gives a prompt about whether the openable angle between the display screens needs to be adjusted on the currently used display screen, and sends the first notification to the adjusting module under the condition that an adjustment is needed.

* * * * *